United States Patent
Ritz et al.

(10) Patent No.: US 7,934,121 B2
(45) Date of Patent: Apr. 26, 2011

(54) TRANSPARENT REPLACEMENT OF A SYSTEM PROCESSOR

(75) Inventors: Andrew J. Ritz, Sammamish, WA (US); Ellsworth D. Walker, Seattle, WA (US); Yimin Deng, Sammamish, WA (US); Christopher Ahna, Puyallup, WA (US)

(73) Assignee: Microsoft Corporation, Redmond, WA (US)

( * ) Notice: Subject to any disclaimer, the term of this patent is extended or adjusted under 35 U.S.C. 154(b) by 473 days.

(21) Appl. No.: 11/675,290

(22) Filed: Feb. 15, 2007

(65) Prior Publication Data

US 2008/0120515 A1   May 22, 2008

Related U.S. Application Data

(60) Provisional application No. 60/866,821, filed on Nov. 21, 2006, provisional application No. 60/866,817, filed on Nov. 21, 2006, provisional application No. 60/866,815, filed on Nov. 21, 2006.

(51) Int. Cl.
*G06F 11/00* (2006.01)

(52) U.S. Cl. ............................................. 714/11; 714/13
(58) Field of Classification Search .................... 714/11, 714/13
See application file for complete search history.

(56) References Cited

U.S. PATENT DOCUMENTS

| | | | |
|---|---|---|---|
| 5,345,590 A | 9/1994 | Ault et al. | |
| 5,689,701 A | 11/1997 | Ault | |
| 5,815,731 A | 9/1998 | Doyle | |
| 6,199,179 B1 | 3/2001 | Kauffman | |
| 6,226,734 B1 | 5/2001 | Kleinsorge | |
| 6,247,109 B1 | 6/2001 | Kleinsorge | |
| 6,421,679 B1 | 7/2002 | Chang | |
| 6,502,162 B2 | 12/2002 | Blumenau | |
| 6,546,415 B1 | 4/2003 | Park | |
| 6,574,748 B1 * | 6/2003 | Andress et al. | 714/11 |
| 6,598,174 B1 | 7/2003 | Parks et al. | |
| 6,640,278 B1 | 10/2003 | Nolan et al. | |
| 6,684,230 B1 | 1/2004 | Momoh | |
| 6,895,586 B1 | 5/2005 | Brasher | |
| 6,907,474 B2 | 6/2005 | Oshins | |
| 6,986,014 B2 | 1/2006 | Qureshi | |
| 7,039,827 B2 | 5/2006 | Meyer et al. | |
| 7,051,243 B2 | 5/2006 | Helgren et al. | |
| 7,065,761 B2 | 6/2006 | Foster et al. | |
| 7,114,064 B2 | 9/2006 | Ramesh | |
| 7,171,590 B2 | 1/2007 | Kadoi | |
| 7,275,180 B2 * | 9/2007 | Armstrong et al. | 714/13 |
| 7,343,515 B1 | 3/2008 | Gilbertson et al. | |
| 7,363,394 B2 * | 4/2008 | Shen et al. | 710/9 |
| 7,426,657 B2 * | 9/2008 | Zorek et al. | 714/13 |
| 7,480,911 B2 * | 1/2009 | Lee et al. | 718/104 |
| 7,509,375 B2 | 3/2009 | Christian et al. | |

(Continued)

OTHER PUBLICATIONS

Fletcher, M., and D.H. Norrie, "Realtime Reconfiguration Using an IEC 61499 Operating System," Proceedings of the 15th International Parallel & Distributed Processing Symposium, San Francisco, Calif., Apr. 23-27, 2001.

(Continued)

*Primary Examiner* — Philip Guyton

(57) ABSTRACT

A method and apparatus for transparently replacing a processor, that receives interrupts in a partitioned computing device, with a replacement processor, is disclosed. The method comprises directing the interrupts to an unchangeable identifier mapped to the processor's identifier and replacing the processor with the replacement processor. An intermediary, such as an I/O APIC, is used for storing the unchangeable identifier. The mapping may use logical mode delivery, physical mode delivery, or interrupt mapping.

19 Claims, 6 Drawing Sheets

U.S. PATENT DOCUMENTS

| | | |
|---|---|---|
| 7,543,182 B2 | 6/2009 | Branda et al. |
| 7,562,262 B2 | 7/2009 | Kondajeri et al. |
| 2002/0016892 A1 | 2/2002 | Zalewski |
| 2002/0053009 A1 | 5/2002 | Selkirk et al. |
| 2002/0144193 A1 | 10/2002 | Hicks et al. |
| 2002/0170039 A1 | 11/2002 | Kovacevic |
| 2003/0163744 A1 | 8/2003 | Yamazaki |
| 2004/0107383 A1 | 6/2004 | Bouchier et al. |
| 2004/0193950 A1 | 9/2004 | Gagne et al. |
| 2004/0221193 A1 | 11/2004 | Armstrong |
| 2005/0283641 A1 | 12/2005 | Clark et al. |
| 2006/0010344 A1* | 1/2006 | Zorek et al. ............ 714/13 |
| 2006/0095624 A1* | 5/2006 | Raj et al. ............ 710/260 |
| 2007/0061634 A1 | 3/2007 | Marisetty et al. |
| 2007/0067673 A1 | 3/2007 | Avizienis |
| 2008/0028413 A1* | 1/2008 | Conklin et al. ............ 718/105 |
| 2008/0120486 A1 | 5/2008 | Ritz et al. |
| 2008/0120518 A1 | 5/2008 | Ritz et al. |
| 2008/0201603 A1 | 8/2008 | Ritz et al. |

OTHER PUBLICATIONS

Milojicic, D., et al., "Global Memory Management for a Multi Computer System," Proceedings of the 4th USENIX Windows Symposium, Seattle, Wash., Aug. 3-4, 2000.

Moore, R.W., "Knowledge-Based Grids," Proceedings of the 18th IEEE Symposium on Mass Storage Systems, Apr. 17-20, 2001, San Diego, Calif., 2000, pp. 29-39.

Written Opinion of the International Searching Authority from PCT/US2007/085180, Apr. 21, 2008.

International Search Report from PCT/US2007/085180, Apr. 21, 2008.

Written Opinion of the International Searching Authority from PCT/US2007/085216, Apr. 22, 2008.

International Search Report from PCT/US2007/085216, Apr. 22, 2008.

Written Opinion of the International Searching Authority from PCT/2007/085184, Mar. 28, 2008.

International Search Report from PCT/2007/085184, Mar. 28, 2008.

* cited by examiner

TRANSPARENT REPLACEMENT OF A SYSTEM PROCESSOR

CROSS-REFERENCES TO RELATED APPLICATIONS

This application claims the benefit of U.S. Provisional Patent Applications "Transparent Replacement of a System CPU," No. 60/866,821, filed Nov. 21, 2006; "Driver Model for Replacing Core System Hardware," No. 60/866,817, filed Nov. 21, 2006; and "Replacing System Hardware," No. 60/866,815, filed Nov. 21, 2006; and U.S. Nonprovisional Patent Applications "Replacing System Hardware," Ser. No. 11/675,272, filed concurrently herewith; "Driver Model for Replacing Core System Hardware," Ser. No. 11/675,243, filed concurrently herewith; and "Correlating Hardware Devices Between Local Operating System and Global Management Entity," Ser. No. 11/675,261, filed concurrently herewith, the subject matter of which is also incorporated herein by reference.

BACKGROUND

A microprocessor is an electronic device capable of performing the processing and control functions for computing devices such as desktop computers, laptop computers, server computers, cell phones, laser printers, and so on. Typically, a microprocessor comprises a small plastic or ceramic package that contains and protects a small piece of semiconductor material that includes a complex integrated circuit. Leads connected to the integrated circuit are attached to pins that protrude from the package allowing the integrated circuit to be connected to other electronic devices and circuits. Microprocessors are usually plugged into or otherwise attached to a circuit board containing other electronic devices.

While a microprocessor integrated circuit typically includes only one computing unit, i.e., one processor, it is possible to include multiple processors in a microprocessor integrated circuit. The multiple processors, which are often referred to as "cores," are included in the same piece of semiconductor material and connected to the microprocessor package pins. Having multiple cores increases the computing power of the microprocessor. For example, a microprocessor with four cores can provide almost the same amount of computing power as four single-core microprocessors. Harnessing the increased computing power that multiple-core microprocessors provide allows computing functions that previously required multiple computing devices to be performed with fewer computing devices.

For example, a server implemented across 32 traditional computing devices, i.e., a 32-way server, may be implemented by eight microprocessors, each having four cores. Taking the concept one step further, if each individual core is eight times more powerful than one of the 32 computing devices, a 32-way server may be implemented by one microprocessor with four cores. Reducing the number of microprocessors reduces the cost of the server, the amount of energy required to power the server, and the amount of maintenance the server requires.

The advantages of using multiple-core microprocessors is driving a trend toward "server consolidation." Server consolidation is the process of taking multiple servers, possibly each providing a different service, and providing all of the services on one physical device, e.g., a four-core processor. While reducing costs, energy, and maintenance, consolidating servers has the effect of putting all of one's eggs into one basket. This puts a greater burden of reliability on the one physical device. If a server is implemented on many separate computing devices and a computing device fails, usually there are other computing devices that are able to take over for the failed computing device. The process of having one computing device take over for a failing computing device is referred to as "failover." Techniques have been developed for traditional server configurations to perform failover in a controlled and orderly fashion to ensure that no data is lost and no ongoing processes are interrupted during the transition from the failing computing device to the replacement computing device.

In order to create multiple-core microprocessor servers that are as robust and reliable as single-core microprocessor servers, similar techniques are required.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Transparently replacing an interrupt controlled processor with a replacement processor is disclosed. Rather than directing interrupts directly to processors, interrupts are directed to an unchangeable identifier mapped to a processor's identifier. Before the interrupts are directed to the replacement processor, the replacement processor's identifier is mapped to the unchangeable identifier. The interrupts are directed to the unchangeable identifier. The mapping of an unchangeable identifier to processor's identifiers rather than directly to processors allows processors to be transparently replaced.

A processor is replaced with a replacement processor by temporarily restricting the interrupts that are directed to the processor to be replaced; activating the replacement processor; mapping the replacement processor's identifier to the unchangeable identifier; isolating the processor to be replaced; and using the mapping of the unchangeable identifier to the replacement processor's identifier to direct subsequent interrupts to the replacement processor. Preferably, an intermediary, such as an I/O APIC, stores the unchangeable identifier.

The mapping of the unchangeable identifier to the replacement processor's identifier may be used for logical mode delivery, physical mode delivery, or interrupt mapping.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 is a block diagram of an exemplary computing device capable of supporting partition unit replacement;

FIG. 2 is a block diagram of an exemplary partition containing a plurality of partition units, one of which is unassociated;

FIG. 3 is a block diagram of the exemplary partition illustrated in FIG. 2 reconfigured to include the previously unassociated partition unit;

FIG. 4A is a block diagram of an exemplary partition unit containing a processor, memory controller, and memory blocks;

FIG. 4B is a block diagram of an exemplary partition unit containing a processor;

DETAILED DESCRIPTION

Figure 1:
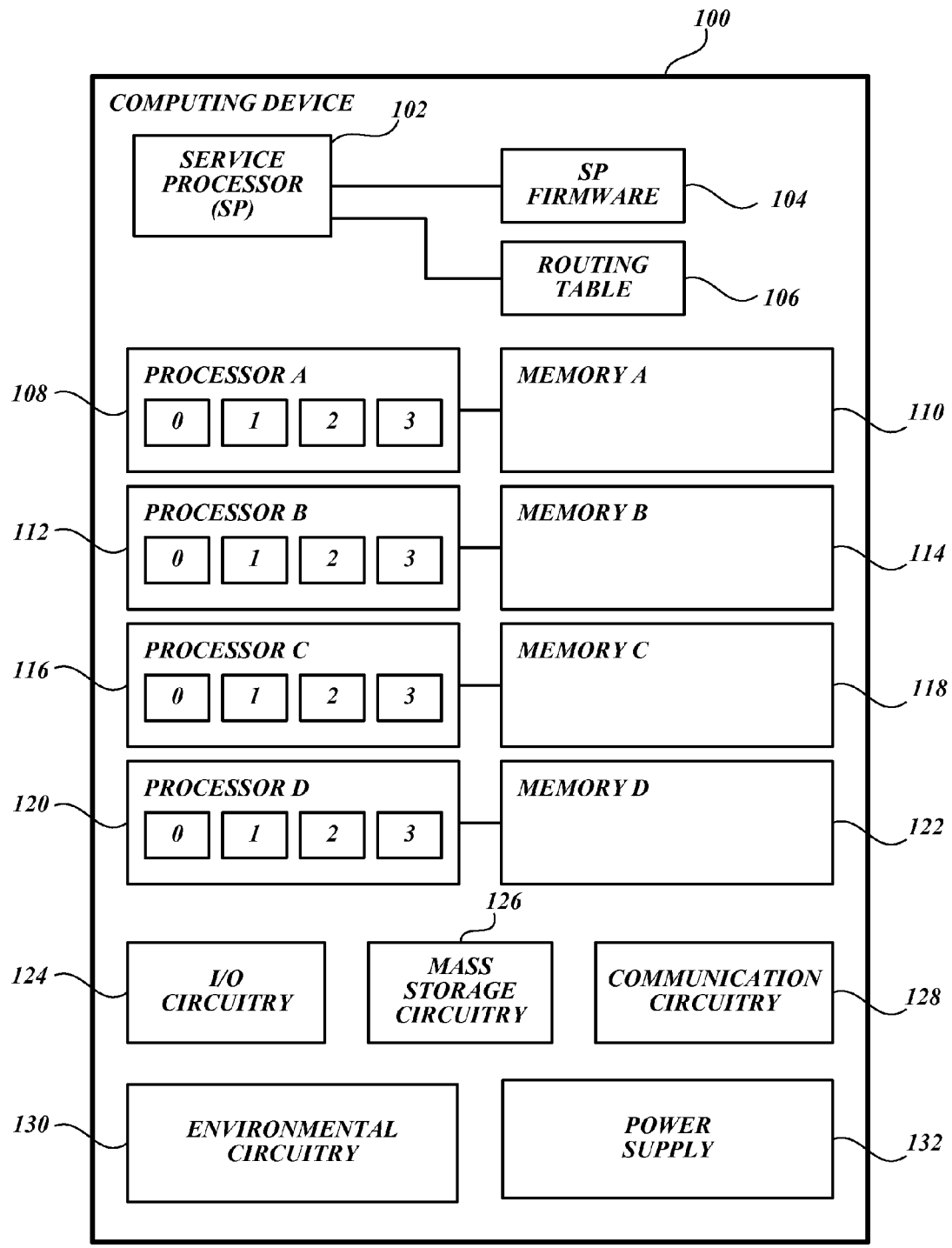

Functionally, a server is an entity on a network that provides a service. For example, a web page server provides a service that returns web pages in response to web page requests. Other exemplary servers are an email server that returns email messages for particular users, a video server that returns video clips from a video archive, etc. Physically, a server is a stand-alone, self-contained computing device that is often connected to other servers through networking or a similar protocol. Traditionally, there is a one-to-one mapping of a functional server to a physical server. For example, an email server is implemented on one traditional physical server. If a traditional physical email server fails, the email service can be restored by replacing the failed physical email server with another physical server.

An exemplary physical server contains a microprocessor, a memory controller, and memory blocks controlled by the memory controller. The memory controller and the memory blocks controlled by the memory controller are often referred to as a unit, i.e., a memory unit. Physical servers may also contain additional microprocessors, memory controllers, memory blocks, and other electronic devices such as interrupt processors. Hence, physical servers containing only a microprocessor and/or memory unit should be construed as exemplary and not limiting. As with many types of computing devices, the operation of a physical server is controlled by a software program called an operating system. A physical server executes the instructions contained in a copy of the operating system, i.e., an instance of the operating system.

Multiple-core microprocessors make it possible to implement more than one functional server on a physical server by partitioning the resources available on the physical server into individually manageable "partitions" comprising "partition units." A partition unit comprises an electrically isolatable microprocessor, a memory unit, and/or perhaps other electronic devices, e.g., an interrupt processor. A partition comprises one or more partition units. Hence, a partition is an electrically isolatable set of partition units and electronic devices within a physical server that can run an independent instance of an operating system, i.e., a local operating system, to implement a functional server. Hereinafter, except where noted, the term "server" refers to a physical server.

Preferably, partitioning is dynamic. That is, partitioning is performed on active computing devices, i.e., computing devices that are energized and performing useful functions. Also preferably, partitioning is transparent. That is, partition units are assigned to, or removed from, partitions with little or no impact on the services the server provides. To support dynamic, transparent partitioning, partition units are managed as whole units and not subdivided. For example, a partition unit is moved into a partition as a unit. Therefore, when a partition unit is replaced, all of the devices in the partition unit are replaced. A server that is capable of being partitioned is a partitionable server. A server system, i.e., system, comprising partitionable servers is a partitionable system. A partitionable system provides flexibility in the number and configuration of partition units and electronic devices assigned to a partition. Partitionable systems support "server consolidation."

Server consolidation is the process of taking multiple traditional servers, possibly each providing a different service, and providing all of the services on one partitionable server. While reducing cost, energy, and maintenance, consolidating service puts a greater burden of reliability on the partitionable server. Whereas a traditional server implemented on many separate computing devices usually has spare computing devices that are able to take over for failing computing devices, a partitionable server needs to look elsewhere for "backup" computing power. The process of having one computing device take over for a failing computing device is referred to as "failover." Techniques have been developed for traditional server configurations to perform failover in a controlled and orderly fashion to ensure that no data is lost and no ongoing processes are interrupted during the transition from the failing computing device to the replacement computing device. In traditional server configurations the failing "computing device" was itself a server. Since servers connect to each other through a network and are not tightly tied together, work needed to be broken into small pieces and shared across the servers, i.e., packetized. This made it easy to replace a failing server since the failing server's work packets could be re-routed. With server consolidation the overhead of the packetizing of the work is gone, but so is the ease of completely removing a server. In order to implement servers on partitionable servers that are as robust and reliable as traditional servers, similar techniques are required.

It is impractical to make partitionable servers more reliable by notifying each of the high-level software applications when a failover is required. To enable high-level software applications to respond to such a notification would require that the computer code for each application be modified to adapt to the failover. Even notifying applications would probably not be enough to provide failover without a mechanism to replace a portion of a running server, which is not usually required in traditional server configurations. Instead, it is more practical and advantageous to involve only the lowest level software in the failover and allow the upper level software, e.g., applications, to behave as though no hardware change has happened.

An implementation of an orderly, low-level, partitionable server failover involves a global management entity and one or more local operating systems. Examples of a global management entity are a service processor (SP) and a baseboard management controller (BMC). An SP is a specialized microprocessor or microcontroller that manages electronic devices attached to a circuit board or motherboard, such as memory controllers and microprocessors. A BMC is also a specialized microcontroller embedded on a motherboard. In addition to managing electronic devices, a BMC monitors the input from sensors built into a computing system to report on and/or respond to parameters such as temperature, cooling fan speeds, power mode, operating system status, etc. Other electronic devices may fulfill the role of a global management entity. Hence, the use of an SP or BMC as a global management entity should be construed as exemplary and not limiting.

A local operating system is an instance of an operating system that runs on one partition. Partition units, which contain logical devices that represent one or more physical devices, are assigned to a specific partition to ensure that the logical devices cannot be shared with logical devices in other partitions, ensuring that a failure will be isolated to a single partition. Such a partition unit may indicate which physical addresses are serviced by a given memory controller and, thereby, map the physical memory addresses to the memory controller and to the physical partition unit containing the memory controller. More than one partition unit may be required to boot and operate a partition. Unused or failing partition units may be electrically isolated. Electrically isolating partition units is similar to removing a server from a group of traditional servers with the advantage that partition units may be dynamically reassigned to different partitions. Managing, e.g., adding or replacing, the partition units in a partitionable server allows a failover to be performed in a controlled and orderly fashion to ensure that the partitionable server is as robust and reliable as traditional servers.

An exemplary computing device 100 for implementing a partitionable server capable of supporting partitions and partition unit addition and/or replacement is illustrated in block diagram form in FIG. 1. The exemplary computing device 100 shown in FIG. 1 comprises a service processor (SP) 102 that is connected to a memory that stores SP firmware 104 and a routing table 106. The computing device 100 also comprises processor A 108 connected to memory block A 110, processor B 112 connected to memory block B 114, processor C 116 connected to memory block C 118, and processor D 120 connected to memory block D 122. The processors 108, 112, 116, and 120 are interrupt controlled processors, i.e., processors that are capable of responding to interrupt signals directed to the processors. Each of the processors 108, 112, 116, and 120 contains four cores designated 0, 1, 2, and 3, which are capable of responding to interrupt signals. The SP 102, which is controlled by the SP firmware 104, uses routing table 106 to manage the processors 108, 112, 126, 120 and memory blocks 110, 114, 118, and 122. Computing device 100 also comprises I/O (input/output) circuitry 124, mass storage circuitry 126, communication circuitry 128, environmental circuitry 130, and a power supply 132. The computing device 100 uses the I/O circuitry 124 to communicate with I/O devices. The computing device 100 uses the mass storage circuitry 126 to interact with internally and externally connected mass storage devices. The computing device 100 uses the communication circuitry 128 to communicate with external devices, usually over networks. The computing device 100 uses the environmental circuitry 130 to control environmental devices such as cooling fans, heat sensors, humidity sensors, etc. The power supply 132 powers the computing device 100. If, for example, SP 102 is replaced by a BMC, the BMC may communicate with and control the environmental circuitry 130 and the power supply 132 more precisely.

Figure 2:
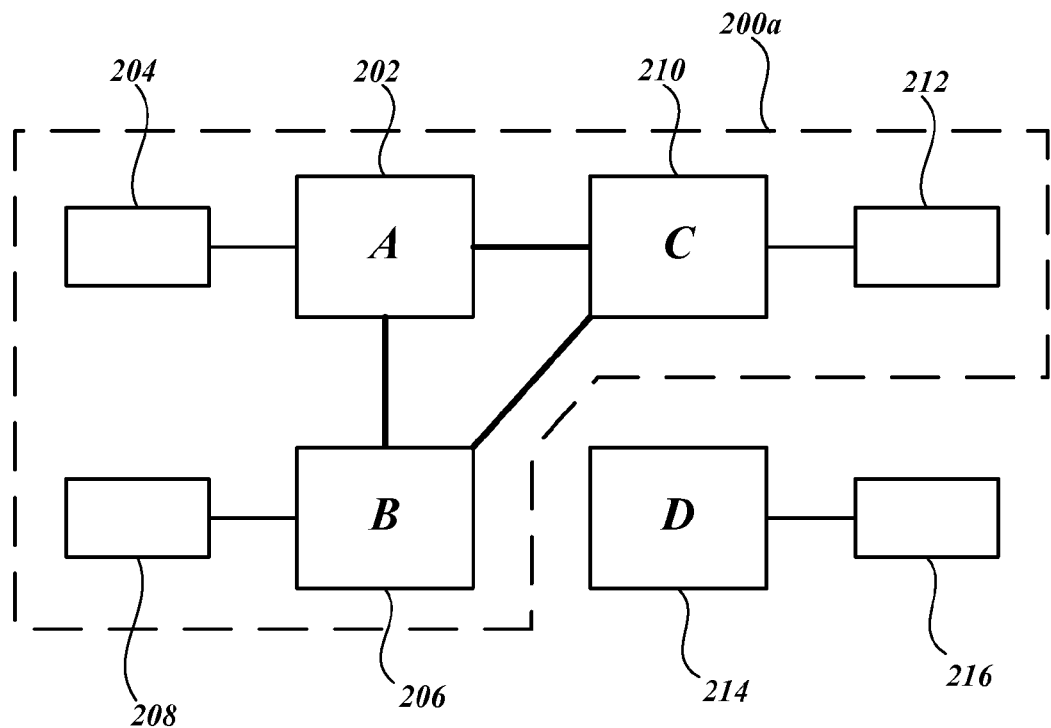
Figure 3:
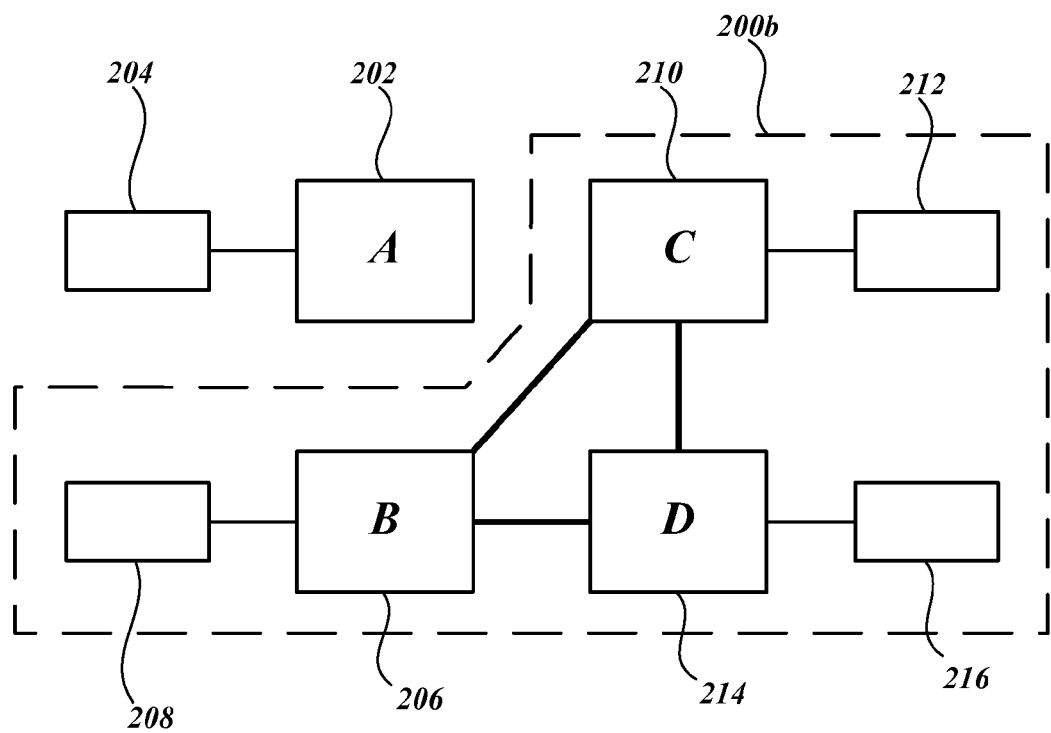

In FIG. 1, which illustrates an exemplary computing device for implementing a partitionable server, an exemplary partition unit is formed by a processor A 108 and a memory block A 110, which is connected to processor A 108. Similarly, three more exemplary partition units are formed by processor B 112 and memory block B 114; processor C 116 and memory block C 122; and processor D 120 and memory block D 122. The four exemplary partition units form an exemplary partition that is managed by an SP 102. FIGS. 2 and 3 illustrate, in diagrammatic form, an exemplary partition similar the partition of FIG. 1 having partition units similar to the partition units formed from the processors and memory blocks shown in FIG. 1.

The replacement of partition units may be understood by comparing the block diagram shown in FIG. 2 to the block diagram shown in FIG. 3. Both of the block diagrams shown in FIG. 2 and FIG. 3 include the same four partition units. Each of the partition units comprises a processor and memory: processor A 202, connected to memory 204; processor B 206, connected to memory 208; processor C 210, connected to memory 212; and processor D 214, connected to memory 216. As discussed more fully below with respect to FIGS. 4A and 4B, partition units may include additional elements, such as a memory controller and large memory blocks or may not include memory other than the small memory associated with a processor. While the block diagrams in both FIG. 2 and FIG. 3 illustrate the same four partition units, the partition 200a shown in FIG. 2 comprises a different set of partition units when compared to the partition 200b shown in FIG. 3.

The partition 200a illustrated in FIG. 2 comprises: processor A 202 and memory 204; processor B 206 and memory 208; and processor C 210 and memory 212. In FIG. 2 the partition unit comprising processor D 214 and memory 216 is not included in partition 200a. In contrast to the partition 200a shown in FIG. 2, the partition 200b shown in FIG. 3 has been changed to comprise a different set of partition units, i.e., a different set of processors and memory blocks. The partition 200b shown in FIG. 3 comprises: processor B 206 and memory 208; processor C 210 and memory 212; and processor D 214 and memory 216. In FIG. 3, the partition unit comprising the processor A 202 and memory 204 is not included in the partition 200b whereas the partition unit comprising processor D 214 and memory 216 is included in partition 200a shown in FIG. 2. In effect, the partition unit comprising processor D 214 and memory 216 replaces the partition unit comprising processor A 202 and memory 204. Such a replacement would be desirable if, for example, processor A 202 and/or memory 204 were failing.

Partition 200a and partition 200b are in effect the same partition in that they have the same partition identifier (ID), the difference being that partition 200a is made up of a different set of partition units than is partition 200b. Prior to the transfer, the partition IDs of processors A, B and C were the ID of partition 200a/200b. The partition ID of processor D was different or not set, i.e., zeroed depending on the prior status of the partition unit including processor D. Regardless of the partition ID of processor D, as explained more fully below, after the transfer the partition ID of processor D becomes the ID of partition 200a/200b.

Replacing a partition unit involves identifying the hardware devices that require replacement and the replacement hardware devices. It is common for a processor, such as processor A 202, to have an Advanced Programmable Interrupt Controller ID (APIC ID) identifying the processor. Similarly, within a partition's local operating system, a memory unit's physical address uniquely identifies the memory unit. Within a partition's local operating system, such as partition 200a's local operating system, a processor's APIC ID is uniquely identifies the processor. A computing device, such as computing device 100, shown in FIG. 1, may include a plurality of partitions. Each partition in the plurality of partitions runs a local operating system having a local view of the partition. The global management entity, such as SP 102, maintains a global namespace containing identifiers that uniquely identify each of the partitions with which the global management entity communicates.

During a partition unit replacement, such as the partition unit replacement shown in FIGS. 2 and 3 and described above, the global management entity and the local operating system of a partition communicate information concerning partition units. For example, the SP 102, shown in FIG. 1, i.e., the global management entity, communicates with partition 200a's local operating system during the replacement of a partition unit. In order for the global management entity to distinguish the partition units of the same partition as well as the partition units of different partitions, the global management entity stores a unique identifier for each partition unit. The unique partition unit identifiers, i.e., partition unit IDs, enable the global management entity to access the resources, e.g., processors and memory units, of each of the partition units of each of the plurality of partitions. In contrast, a partition's local operating system can access only the resources included in the partition.

Partition unit IDs are a combination of the partition ID and a hardware device identifier such as an APIC ID for a processor or a physical address for a memory unit. For example, to create a unique global identifier for processor C 210, processor C 210's APIC ID is combined with partition 200a's partition ID. Similarly, to create a unique global identifier for memory 212, memory 212's physical address is combined with partition 200a's partition ID.

When a partition unit is replaced, each of the hardware devices in the partition unit is replaced. For example, as shown in FIGS. 2 and 3, a first partition unit comprises processor A 202 and the memory 204 that is connected to processor A 202; and, a second partition unit comprises processor D 214 and the memory 216 that is connected to processor A 214. When the second partition unit replaces the first partition unit, processor D 214 replaces processor A 202 and the memory 216 replaces memory 204.

Figure 4A:
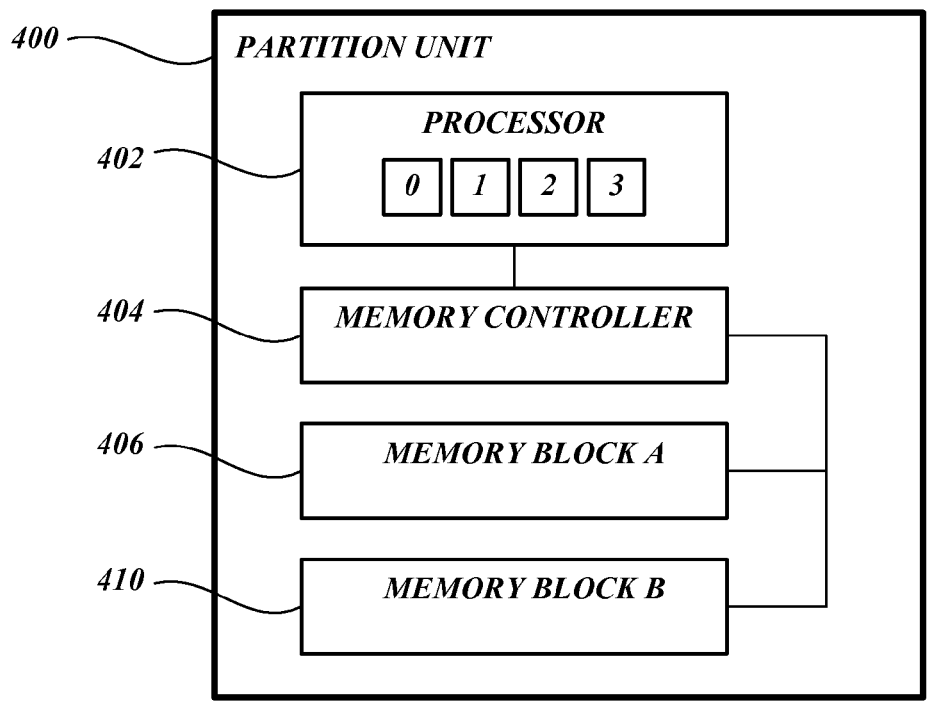
Figure 4B:
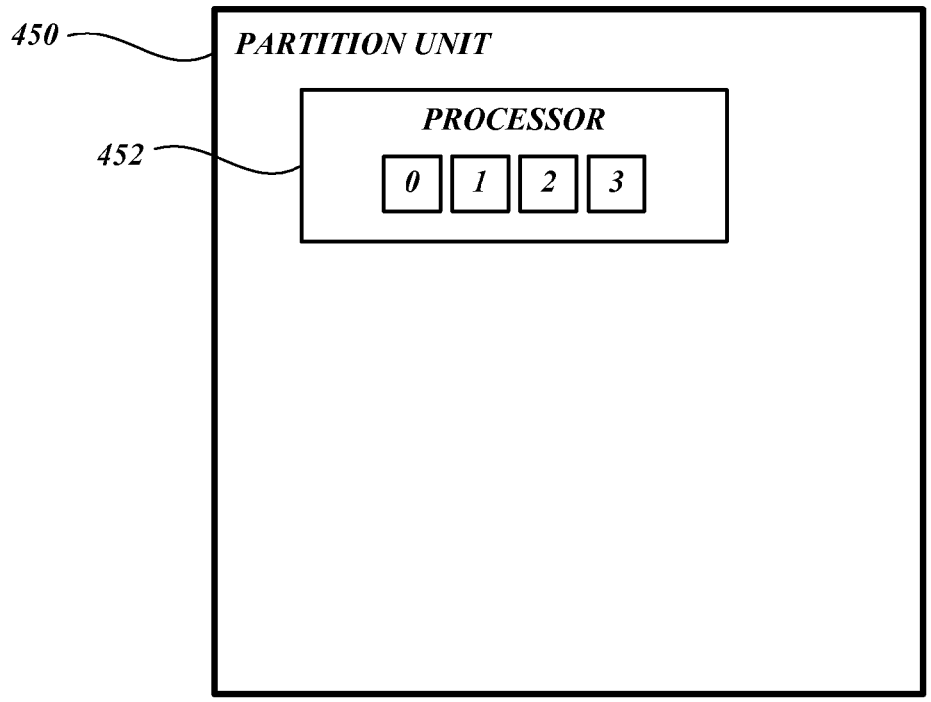

While a single processor and a single memory block, such as processor A 202 and memory 204, may comprise a partition unit, a partition unit may have other forms. A detailed view of an exemplary partition unit 400 having a different form is illustrated in FIG. 4A. In FIG. 4A, as in FIG. 1, the exemplary partition unit 400 comprises a processor 402 containing four cores: 0, 1, 2, and 3 connected to a memory controller 404 that is connected to two memory blocks—memory block A 406 and memory block B 410. The processor 402 communicates with memory controller 404, which controls memory block A 406 and memory block B 410. Another form of a partition unit is illustrated in FIG. 4B. The partition unit 450 shown in FIG. 4B contains a processor 452 that, like the processor illustrated in FIG. 4A, includes four cores: 0, 1, 2 and 3. The partition unit shown in FIG. 4B does not include memory or a memory controller or blocks of memory. Other partition units may contain other logical devices that represent physical devices in addition to a processor, memory controller, and memory blocks and various combinations thereof well known to those skilled in the art. Hence, the partition units 400 and 450 should be construed as exemplary and not limiting.

A logical device in a typical partition unit may be capable of notifying the local operating system of the device's status. Alternatively, or in addition, the local operating system controlling the partition unit may use predictive analysis to assess the status of the logical device and determine if the logical device might be failing and thus, may be a candidate for replacement. While a person, such as a system administrator, might check device status as a part of regular maintenance, it is preferable to have the hardware itself notify the local operating system of an impending failure. In some situations, it may be desirable to upgrade a processor from one model to another model or to add processors and/or memory to a system. While a system administrator may perform such functions, it is preferable to automate such replacements and additions by using explicitly programmed instructions or by periodically timed instructions that make use of partitions, partition units, and the ability of hardware to report status.

Processes, such as the processes in a local operating system, that are running on a processor that is to be replaced must be quiesced, i.e., put into an inactive state, because if the processor is in use, the processor's state is constantly changing. If the processor's state is changing, the processor cannot be safely and reliably replaced because the processor's state cannot be safely and reliably transferred. Therefore, a pause operation is executed by the processor that is to be replaced, e.g., a failing processor, to prevent the processor's state from changing. Those skilled in the art and others will appreciate that the process of pausing a processor to prevent the processor's state from changing is referred to as "quiescing" the processor. A system, such as the computing device 100 shown in FIG. 1, may also be quiesced by pausing or deactivating physical devices, e.g., processors A 108, B 112, etc., in the system and pausing threads of execution. Pausing or deactivating devices in the system and pausing threads of execution prevents devices and threads of execution from attempting to interrupt a processor that is to be replaced.

A partition unit, such as the partition unit 450 illustrated in FIG. 4B, may need to be replaced because the partition unit contains a failing processor, e.g., processor 452. In order to replace the failing processor, perhaps using a process such as the exemplary process described above, it is preferable to first identify the failing processor. A way to identify a processor, failing or otherwise, is to use a Advanced Programmable Interrupt Controller identifier (APIC ID). A processor's APIC ID is stored in the processor in logical and/or physical form. A processor's logical APIC ID can be changed in the processor, usually by reprogramming a register containing the APIC ID. A processor's physical APIC ID is hardwired into the processor, i.e., fixed, and cannot be changed. An operating system, e.g., a local operating system, uses APIC IDs to, for example, schedule new threads on processors and direct interrupts to particular processors. Processors may be physical, for example processor 452 shown in FIG. 4B; or logical, for example core "0" in processor 452.

Figure 5:
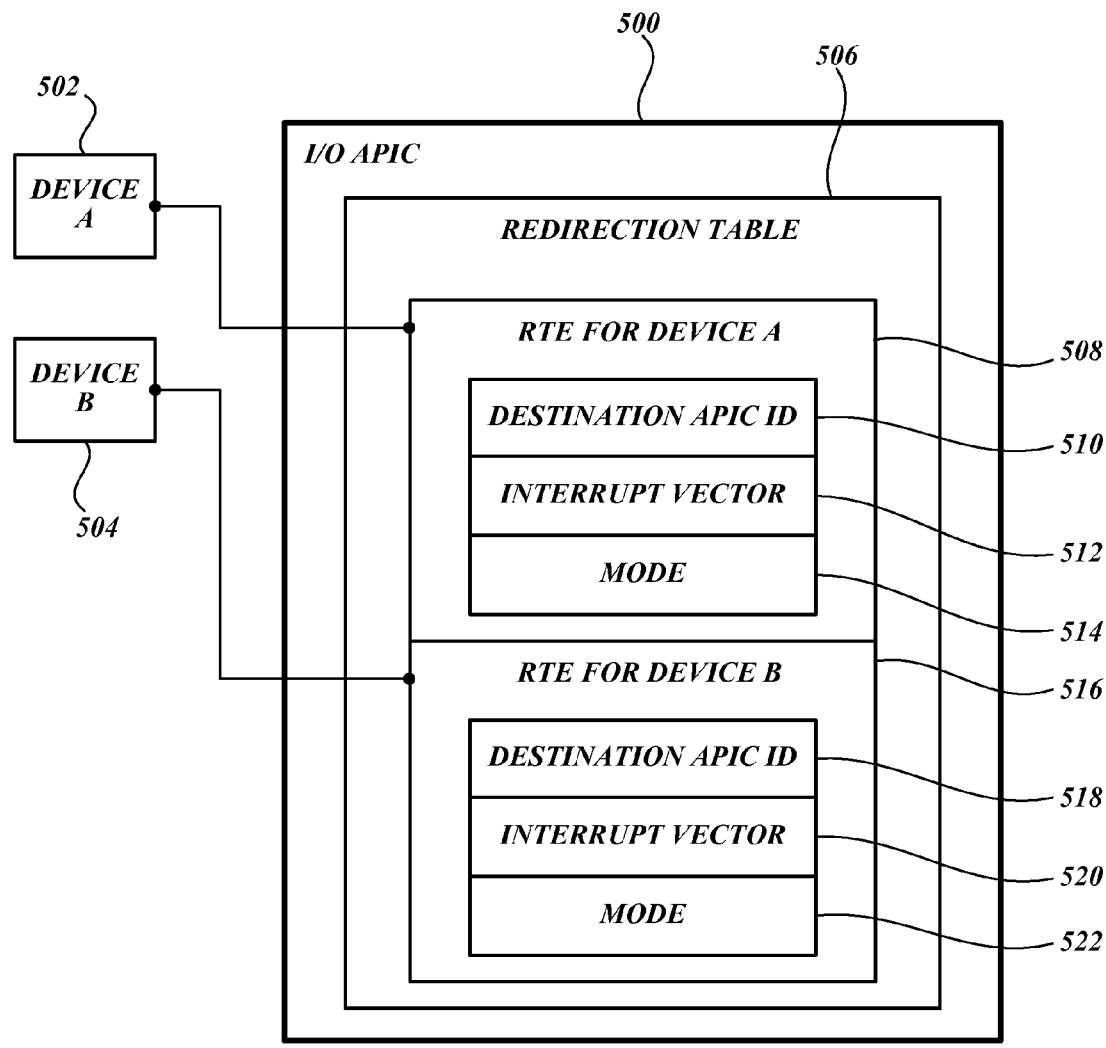
FIG. 5 is a block diagram of a plurality of devices connected to an exemplary I/O APIC.

When an operating system starts, each logical processor is assigned a unique, initial APIC ID. The initial APIC ID is composed of the physical processor's ID and the logical processor's ID within the physical processor. An operating system may use initial APIC IDs to direct interrupts to particular processors. A device, e.g., a disc drive, may transmit an interrupt signal directly to the processor using a message signaled interrupt (MSI). A device interrupt may instead be routed into an intermediary software entity, i.e., an intermediary. The device generates a signal that is transmitted to the intermediary and the intermediary forwards the signal to the processor. An exemplary traditional intermediary is an Input/Output Advanced Programmable Interrupt Controller (I/O APIC). The block diagram in FIG. 5 illustrates certain functional parts of an exemplary I/O APIC 500 and two exemplary devices—device A 502 and device B 504. There may be more functional parts and more devices. Hence, the number of devices and functional parts should be construed as exemplary and not limiting. Exemplary I/O APIC 500, shown in FIG. 5, contains a redirection table 506. The redirection table 506 contains redirection table entries (RTEs). The redirection table 506 comprises an RTE for device A 508 that is associated with device A 502 and an RTE for device B 516 that is associated with device B 504. The RTE for device A 508 comprises a destination APIC ID 510, an interrupt vector 512, and a mode (mode descriptor) 514. The RTE for device B 516 comprises a destination APIC ID 518, an interrupt vector 520, and a mode (mode descriptor) 522. An interrupt vector is an entry that contains, or refers, to code that handles the particular kind of interrupt. An interrupt may be a conveyed over a dedicated, physical "wire," i.e., physical connection, connected to a specific entry number in the I/O APIC.

The replacement of a partition unit, such as the partition unit 450 illustrated in FIG. 4B, involves transferring the state of the failing processor to a spare processor intended to replace the failing processor. A processor's state may include, but is not limited to, information stored in the processor's external registers, information in the processor's internal registers and circuitry, and the physical APIC ID and logical APIC ID. Not all processors are able to have their physical APIC ID transferred or changed to accept another physical APIC ID. The physical APIC ID may be hardwired inside of a processor. In such processors, the physical APIC ID of a first processor cannot be transferred to a second processor. Hence, the second processor is unable to take on the physical identity of the first processor.

There are ways to allow the physical APIC ID of a processor to be unique yet still transfer the state of the processor, e.g., a failing processor, to another processor, e.g., a replacement processor. To other entities, the two processors will appear to be identical. Thus, for example, an interrupt directed to the failing processor will instead be directed to the replacement processor.

As described above, on many processors, the APIC ID, i.e., the physical and/or logical APIC ID, may be hardwired inside of the processor preventing the identity of the processor from being transferred. Rather than relying directly on the APIC ID to identify a processor, a processor's APIC ID, i.e., physical and/or logical APIC ID, may be hidden inside of a service, making it possible to present the other parts of the system with a service for doing operations that involve the APIC ID without direct reference to the APIC ID. In discussing such a service, it is helpful to divide a system, e.g., computing device 100 into two portions—a service processor (SP) portion and a non-SP portion. The SP portion is the combination of the SP 102, the SP firmware 104, and the routing table 106. The non-SP portion comprises the remaining items in the computing device 100. To transparently replace a processor, the non-SP portion is isolated from the identity of the processor allowing the processor identifier to be remapped. Remapping processor identifiers is accomplished by a set of instructions that may be stored in the SP portion, e.g., the SP firmware 104, or stored in other memory and pointed to by the SP firmware 104. The set of instructions for remapping processor identifiers is referred to hereafter as the "processor remapping service".

Rather than relying directly on a processor's APIC ID to identify the processor, the processor's APIC ID is hidden inside of the processor remapping service, making it possible to present the non-SP portion with a service for doing operations that involve APIC IDs without direct reference to the APIC IDs. The processor remapping service assigns and accepts "unchangeable" APIC IDs, i.e., APIC IDs that do not change and are used by the non-SP portion. The processor remapping service converts the unchangeable APIC ID to the appropriate changeable APIC ID. Hence, during a processor replacement, whether the changeable APIC ID is physical or logical, the changeable APIC ID can be changed to refer to a replacement processor; thus, making the processor replacement transparent.

An exemplary processor remapping service provides three processes for transparently replacing processors: logical mode delivery, physical mode delivery, and interrupt remapping. By using one of the three processes during a processor replacement, the details of which processor is being used are abstracted out and hidden from the non-SP portion.

In the logical mode delivery process, the system, e.g., computing device 100, is configured such that the non-SP portion uses only logical APIC IDs and are not permitted to access or use physical APIC IDs. In the logical mode delivery process, the processor remapping service uses the logical APIC ID as a remapping register. A logical APIC ID of a processor can be programmed, i.e., changed, usually by low level software. The logical APIC ID is changeable and can be easily transferred to another processor without relying on I/O APICs and MSIs. By inserting the failing processor's logical APIC ID into the replacement processor, the failing processor's logical APIC ID is mapped to the replacement processor.

If logical mode delivery is not available in a computing device and/or system, physical mode delivery may be used to transparently replace processors. Physical mode delivery involves an intermediary. An exemplary intermediary is a redirection table in an I/O APIC. (See FIG. 5 and the foregoing description.) In physical mode delivery, an I/O APIC's redirection table, i.e., an intermediary, stores unchangeable APIC IDs for processors. The unchangeable APIC IDs are mapped to the processors' physical APIC IDs. A processor's unchangeable APIC ID is used by the non-SP portion allowing the processor to be replaced by another processor having a different physical APIC ID without disturbing operations in the non-SP portion.

In the physical mode delivery process an I/O APIC provides an interface through which an SP interacts with the I/O APIC. The physical mode delivery process takes advantage of the already existing I/O APIC interface to program a new physical ID, i.e., the physical ID of the replacement processor, into the I/O APIC's redirection table.

In the interrupt remapping process, the processor remapping service redirects interrupts from a processor that is replaced, e.g., processor A 202, to a replacement processor, e.g., processor D 214. Traditionally, devices that generate interrupts, such as a disc drive controller in the mass storage circuitry 126 of computing device 100, store the APIC ID of a processor that is intended to receive the interrupts, i.e., the destination processor. If the disc drive controller is "hardwired," i.e., connected physically by a wire, circuit board trace, etc., to an I/O APIC, the disc drive controller sets the voltage on the wire to a level that triggers the programmed instructions in the I/O APIC's redirection table. Usually there are other devices that are connected into other entries in the I/O APIC's redirection table. Hence, there needs to be an interface at the connections of the I/O APIC to manage the arriving interrupts.

In the logical mode delivery, physical mode delivery, and interrupt remapping processes, the local operating system is quiesced and the state is transferred. It is particularly important the external devices are not aware of the physical APIC ID. Using logical delivery is the easiest way to accomplish that. If a device is "hardwired," i.e., connected physically by a wire, circuit board trace, etc., to an I/O APIC, the device sets the voltage on the wire to a level that triggers the programming in the I/O APIC. It is likely that there are other devices that hook into other entries in the redirection table in the I/O APIC. The I/O APIC is, in effect, a shared state repository. Hence, there needs to be some interface at the connections of the I/O APIC to manage the shared state repository, i.e., the I/O APIC.

Figure 6:
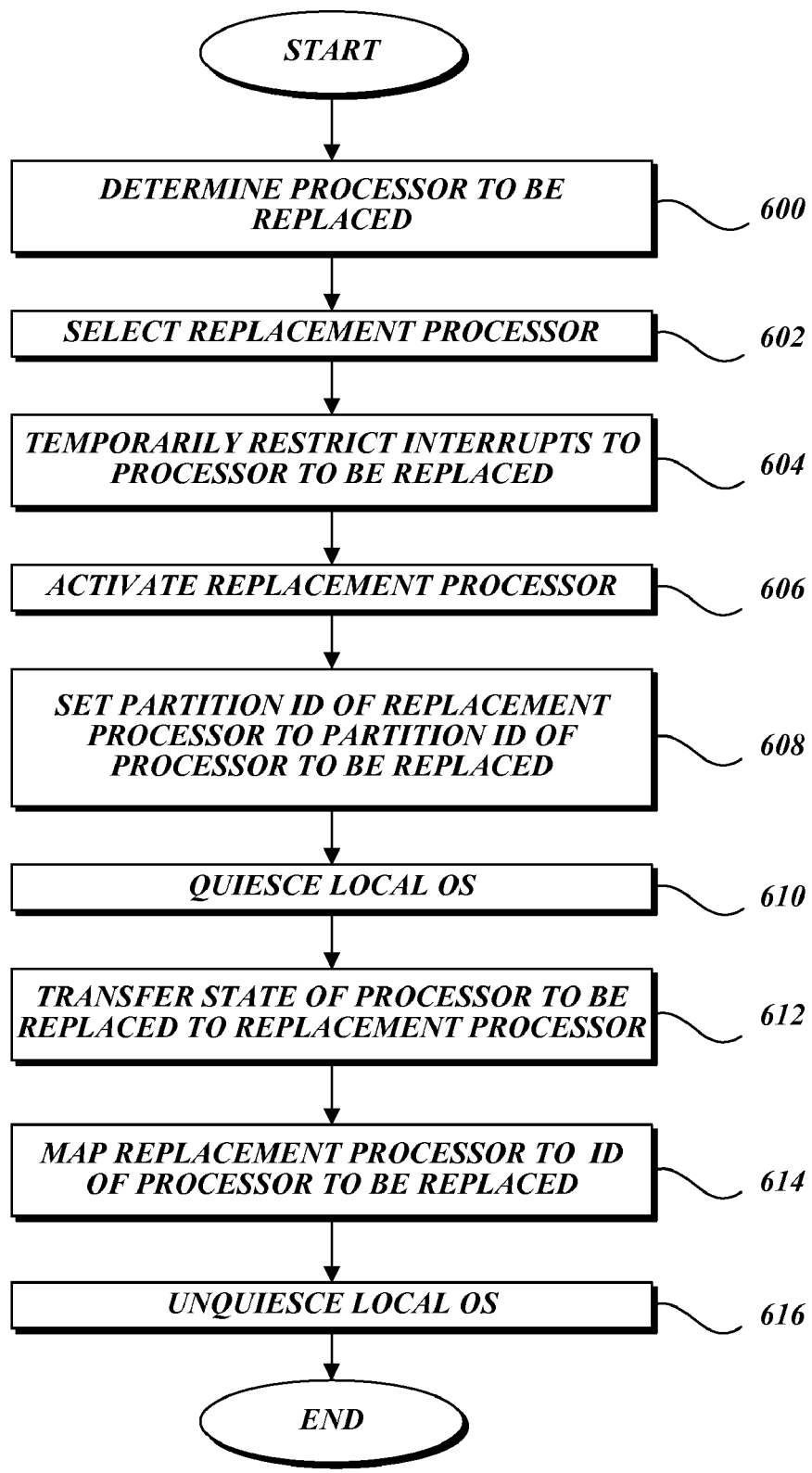
FIG. 6 is an functional flow diagram of an exemplary process for replacing a processor.

An exemplary process for replacing a processor, e.g., a failing processor, is illustrated in FIG. 6. The process begins at block 600 in which a global management entity, e.g., SP 102 shown in FIG. 1, determines that a processor needs to be replaced. For example, the global management entity detects that the processor has produced a certain quantity and type of errors that indicate that the processor may fail and determines that the processor needs to be replaced. At block 602, the global management entity selects a replacement processor, e.g., processor D 214 of partition 200*a* shown in FIG. 2. A replacement processor may be selected from a plurality of spare processors according to selection criteria such as speed, specialized computing features, etc. It is also possible to select a replacement processor from a plurality of processors executing less important processes. Less important processes may be halted or moved to other processors to allow a processor to be reused as a replacement processor. To enable the selection of replacement processors from a plurality of spare and/or other sources of processors, the global management entity may maintain a processor database that contains selection criteria values for each processor managed by the global management entity. If a processor is failing, the global management entity forms database queries that, when submitted to the database, retrieve a list of replacement processor candidates from the database. An exemplary database query includes the identity of the failing processor and a list of relevant selection criteria and selection criteria parameters. The database, using the query, retrieves the selection criteria values of the failing processor, compares the selection criteria values of the failing processor to the selection criteria values of spare, or otherwise potentially available, processors in the processor database. The identities of processors with selection criteria values that meet the selection criteria values of the failing processor are returned, in a list, to the global management entity. The global management entity selects a replacement processor from the list, perhaps using other criteria. It is also possible for the processor database to return the identity of only one replacement processor that is then used by the global management entity. Other ways of selecting replacement processors using selection criteria are possible. Hence, using a processor database to select replacement processors should be construed as exemplary and not limiting.

Figure 7:
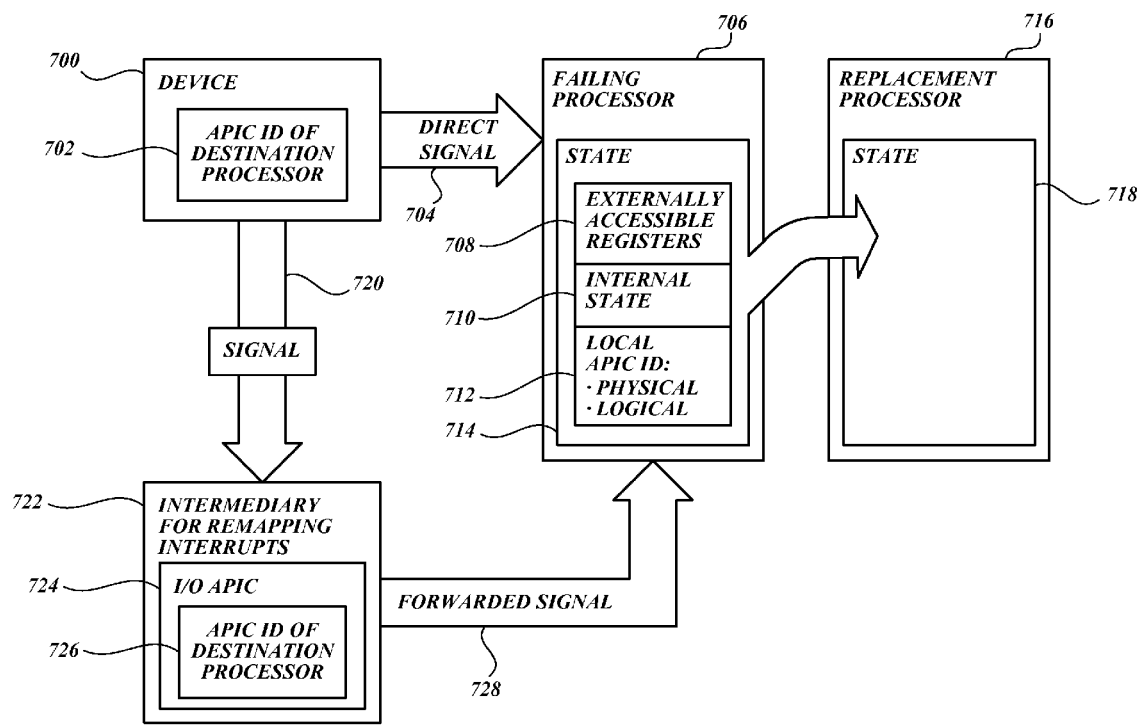
FIG. 7 is an block diagram of an exemplary device interacting with an exemplary intermediary, an exemplary failing processor, and an exemplary replacement processor.

Continuing in FIG. 6 at block 604, the global management entity temporarily restricts interrupts to the processor to be replaced to reduce the activity of the processor thus preparing the processor for replacement. At block 606, the replacement processor, perhaps selected using the selection process described above, is activated. At block 608, the global management entity sets the partition ID of the replacement processor to the partition ID of the processor to be replaced in order to "move" the replacement processor into the partition of the processor to be replaced. For example, the partition ID of processor D 214, shown in FIG. 2, is set to the partition ID of processor A 202 in order to move processor D 214 into partition 200*a*, the partition of processor A 202. At block 610, the local OS, i.e., local operating system, is quiesced. Those skilled in the art will appreciate that quiescing an operating system, e.g., a local operating system, is a process for reducing the activity of an operating system. At block 612, the global management entity transfers the state of the processor to be replaced to the replacement processor. An exemplary processor state is illustrated in FIG. 7 and described later below. At block 614, the global management entity maps the replacement processor to the identity of the processor to be replaced and updates the local OS's state to reflect the mapping. More specifically, the replacement processor is mapped to the complete ID, i.e., the combination of the partition ID and the APIC ID, of the processor to be replaced and the local OS's state is updated to reflect the mapping. At block 616, the local OS is unquiesced, i.e., the local OS is reactivated. After block 616, the process ends.

FIG. 7 is an block diagram showing how an exemplary device interacts with an exemplary intermediary to send a signal to an exemplary failing processor, which is routed to an exemplary replacement processor. In FIG. 7, a exemplary device 700 contains the APIC ID of the destination processor 702. A signal 720 carries the APIC ID of destination processor 702 to an intermediary for remapping interrupts 722. The intermediary for remapping interrupts 722 contains an I/O APIC data structure 724. The I/O APIC 724 contains the APIC ID of the destination processor 726. The device 700 may send the APIC ID of a destination processor such as failing processor 706 via a direct signal 704 or via a signal 720 through the intermediary for remapping interrupts 722, which sends a forwarded signal 728 to the destination (failing) processor 706. The failing processor 706 has a state 714. The state 714 of the failing processor 706 is determined by the state of externally accessible registers 708, the internal state 710 of the failing processor 706, and a local APIC ID 712. The local APIC ID contains a physical address and a logical address. While the state describing a processor normally includes the state of externally accessible registers 708, the internal state 710 of the failing processor 706, and a local APIC ID 712, the state of the failing processor 706 may also include other elements or may not include one or more of the previously mentioned elements. Hence the contents of the state that describe the state of a processor should be construed as exemplary and not limiting. The state 714 of failing processor 706 is transferred to, or copied to, the state 718 of a replacement processor 716.

While the preferred embodiment of the invention has been illustrated and described, it will be appreciated that various changes can be made therein without departing from the spirit and scope of the invention.

The invention claimed is:

1. A method of transparently replacing a processor with a replacement processor in a partitioned computing device containing a plurality of partition units, each of which includes a processor that is capable of responding to interrupts, the method comprising:
   determining that a processor is to be replaced;
   selecting a replacement processor;
   temporarily restricting the interrupts that interrupt the processor to be replaced;
   activating the replacement processor;
   setting a partition ID of the replacement processor to a partition ID of the processor to be replaced;
   transferring a state of the processor to be replaced to the replacement processor; and
   mapping the replacement processor to an identifier of the processor to be replaced using logical mode delivery, wherein logical mode delivery comprises:
   (a) configuring the computing device such that the computing device uses logical APIC IDs;
   (b) using the logical APIC IDs as remapping registers; and
   (c) inserting a logical APIC ID of the processor to be replaced into the replacement processor.

2. The method of claim 1, further comprising redirecting interrupts from the processor to be replaced to the replacement processor.

3. The method of claim 1, wherein:
   the computing device contains a partition comprising the plurality of partition units, the partition having a partition ID for identifying the partition;
   the processor to be replaced is a processor assigned to the partition;
   the partition ID of the processor to be replaced is the partition ID of the partition;
   the processor to be replaced has a processor ID different from the partition ID;
   a proxy ID different from the processor ID and the partition ID is mapped to the processor ID of the processor to be replaced, such that interrupts directed to the proxy ID interrupt the processor to be replaced, wherein the proxy ID is mapped to only one processor at a time; and the mapping comprises mapping the proxy ID to a processor ID of the replacement processor, such that the interrupts directed to the proxy ID interrupt the replacement processor.

4. A method of transparently replacing a processor with a replacement processor in a partitioned computing device containing a plurality of partition units, each of which includes a processor that is capable of responding to interrupts, the method comprising:
- determining that a processor is to be replaced;
- selecting a replacement processor;
- temporarily restricting the interrupts that interrupt the processor to be replaced;
- activating the replacement processor;
- setting a partition ID of the replacement processor to a partition ID of the processor to be replaced;
- transferring a state of the processor to be replaced to the replacement processor; and
- mapping the replacement processor to an identifier of the processor to be replaced using physical mode delivery, wherein physical mode delivery comprises:
  - (a) storing an unchangeable APIC ID for a processor in an intermediary;
  - (b) mapping the unchangeable APIC ID to the processor's physical APIC ID; and
  - (c) directing the interrupts to the unchangeable APIC ID mapped to the processor's physical APIC ID.

5. The method of claim 4, wherein the intermediary is an I/O APIC.

6. The method of claim 4, further comprising redirecting interrupts from the processor to be replaced to the replacement processor.

7. The method of claim 4, wherein:
- the computing device contains a partition comprising the plurality of partition units, the partition having a partition ID for identifying the partition;
- the processor to be replaced is a processor assigned to the partition;
- the partition ID of the processor to be replaced is the partition ID of the partition;
- the processor to be replaced has a processor ID different from the partition ID;
- a proxy ID different from the processor ID and the partition ID is mapped to the processor ID of the processor to be replaced, such that interrupts directed to the proxy ID interrupt the processor to be replaced, wherein the proxy ID is mapped to only one processor at a time; and
- the mapping comprises mapping the proxy ID to a processor ID of the replacement processor, such that the interrupts directed to the proxy ID interrupt the replacement processor.

8. In a computing device containing at least one partition each comprising a plurality of partition units, each partition being identified by a partition identifier (ID), each of the partition units including a processor identified in part by the partition ID of the partition to which the partition unit belongs, the processors being capable of responding to interrupts, a method of transparently replacing a processor with a replacement processor, the method comprising:
- determining that a processor is to be replaced;
- selecting a replacement processor;
- temporarily restricting the interrupts that interrupt the processor to be replaced;
- activating the replacement processor;
- setting the partition ID of the replacement processor to the partition ID of the processor to be replaced;
- transferring a state of the processor to be replaced to the replacement processor; and
- mapping the replacement processor to an identifier of the processor to be replaced using logical mode delivery, the logical mode delivery comprising:
  - (a) configuring the computing device such that a non-global management entity of the computing device uses only logical APIC IDs;
  - (b) using the logical APIC IDs as remapping registers; and
  - (c) inserting a logical APIC ID of the processor to be replaced into the replacement processor.

9. The method of claim 8, further comprising:
- quiescing an operating system of the partition of the processor to be replaced prior to the transferring of the state of the processor to be replaced to the replacement processor; and
- unquiescing the operating system after the transferring.

10. The method of claim 8, wherein the selecting of a replacement processor, the temporary restricting of interrupts and the transferring of the state of the processor to be replaced to the replacement processor are performed by a global management entity.

11. The method of claim 8, further comprising redirecting interrupts from the processor to be replaced to the replacement processor.

12. The method of claim 8, wherein:
- the processor to be replaced has a processor ID, the processor ID being a different identifier than the partition ID;
- a proxy ID different from the processor ID and the partition ID is mapped to the processor ID of the processor to be replaced, such that interrupts directed to the proxy ID interrupt the processor to be replaced, wherein the proxy ID is mapped to only one processor at a time; and
- the mapping comprises mapping the proxy ID to a processor ID of the replacement processor, such that the interrupts directed to the proxy ID interrupt the replacement processor.

13. In a computing device containing at least one partition each comprising a plurality of partition units, each partition being identified by a partition identifier (ID), each of the partition units including a processor identified in part by the partition ID of the partition to which the partition unit belongs, the processors being capable of responding to interrupts, a method of transparently replacing a processor with a replacement processor, the method comprising:
- determining that a processor is to be replaced;
- selecting a replacement processor;
- temporarily restricting the interrupts that interrupt the processor to be replaced;
- activating the replacement processor;
- setting the partition ID of the replacement processor to the partition ID of the processor to be replaced;
- transferring a state of the processor to be replaced to the replacement processor; and
- mapping the replacement processor to an identifier of the processor to be replaced using physical mode delivery, wherein physical mode delivery comprises:
  - (a) storing an unchangeable APIC ID for a processor in an intermediary;
  - (b) mapping the unchangeable APIC ID to the processor's physical APIC ID; and
  - (c) directing the interrupts to the unchangeable APIC ID mapped to the processor's physical APIC ID.

14. The method of claim 13, wherein the intermediary is an I/O APIC.

15. The method of claim 13, further comprising redirecting interrupts from the processor to be replaced to the replacement processor.

16. The method of claim 13, wherein:
the processor to be replaced has a processor ID, the processor ID being a different identifier than the partition ID;
a proxy ID different from the processor ID and the partition ID is mapped to the processor ID of the processor to be replaced, such that interrupts directed to the proxy ID interrupt the processor to be replaced, wherein the proxy ID is mapped to only one processor at a time; and
the mapping comprises mapping the proxy ID to a processor ID of the replacement processor, such that the interrupts directed to the proxy ID interrupt the replacement processor.

17. The method of claim 13, further comprising:
quiescing an operating system of the partition of the processor to be replaced prior to the transferring of the state of the processor to be replaced to the replacement processor; and
unquiescing the operating system after the transferring.

18. The method of claim 13, wherein the selecting of a replacement processor, the temporary restricting of interrupts and the transferring of the state of the processor to be replaced to the replacement processor are performed by a global management entity.

19. In a computing device containing at least one partition comprising a plurality of partition units, the partition identified by a partition identifier, each of the partition units including a processor identified in part by the partition identifier, the processors capable of responding to interrupts, a method of transparently replacing a processor with a replacement processor, the method comprising:
(a) in response to determining that a processor is to be replaced, selecting a replacement processor;
(b) temporarily restricting the interrupts that are directed to the processor to be replaced;
(c) activating the replacement processor;
(d) setting the partition ID of the replacement processor to the partition ID of the processor to be replaced;
(e) transferring the state of the processor to be replaced to the replacement processor; and
(f) mapping the replacement processor to an identifier of the processor to be replaced, the mapping being performed using at least one of physical mode delivery and logical mode delivery,
wherein,
when the mapping uses physical mode delivery, the mapping comprises
(i) storing an unchangeable APIC ID for a processor in an intermediary;
(ii) mapping the unchangeable APIC ID to the processor's physical APIC ID; and
(iii) directing the interrupts to the unchangeable APIC ID mapped to the processor's physical APIC ID, and
when the mapping uses logical mode delivery, the mapping comprises
(i) configuring the computing device such that a non-global management entity of the computing device uses only logical APIC IDs;
(ii) using the logical APIC ID as a remapping register; and
(iii) inserting the processor's logical APIC ID into the replacement processor.

* * * * *